(12) United States Patent
Marupaduga et al.

(10) Patent No.: US 10,084,527 B1
(45) Date of Patent: Sep. 25, 2018

(54) WIRELESS COMMUNICATION SYSTEM TO CONFIGURE RESOURCE BLOCK USAGE IN A WIRELESS REPEATER

(71) Applicant: Sprint Communications Company L.P., Overland Park, KS (US)

(72) Inventors: Sreekar Marupaduga, Overland Park, KS (US); John W. Prock, Peculiar, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 71 days.

(21) Appl. No.: 15/417,842

(22) Filed: Jan. 27, 2017

(51) Int. Cl.
*G01R 31/08* (2006.01)
*H04B 7/15* (2006.01)
*H04W 72/04* (2009.01)
*H04L 12/26* (2006.01)
*H04W 88/02* (2009.01)
*H04W 88/08* (2009.01)
*H04W 84/04* (2009.01)

(52) U.S. Cl.
CPC ............... *H04B 7/15* (2013.01); *H04L 43/16* (2013.01); *H04W 72/0413* (2013.01); *H04W 72/0473* (2013.01); *H04W 84/042* (2013.01); *H04W 88/02* (2013.01); *H04W 88/08* (2013.01)

(58) Field of Classification Search
USPC .................................................. 370/252, 330
See application file for complete search history.

(56) References Cited

U.S. PATENT DOCUMENTS

| 7,710,913 | B2 | 5/2010 | Kilfoyle et al. |
| 8,116,254 | B2 | 2/2012 | Sabat et al. |
| 2012/0202512 | A1 | 8/2012 | Braithwaite |

*Primary Examiner* — Phuongchau Ba Nguyen (57) ABSTRACT

A wireless communication system restricts resource block usage in wireless repeaters. The wireless communication system includes a wireless access point configured to transfer user data for User Equipment (UEs) wherein some of the UEs are connected to the wireless repeaters. The wireless access point is further configured to determine an average uplink transmission power for the UEs, and if the average uplink transmission power for the UEs exceeds an uplink transmission power threshold, then the wireless access point is configured to determine resource block restrictions for the wireless repeaters. The wireless access point is also configured to transfer the resource block restrictions for delivery to the wireless repeaters.

18 Claims, 6 Drawing Sheets

WIRELESS COMMUNICATION SYSTEM TO CONFIGURE RESOURCE BLOCK USAGE IN A WIRELESS REPEATER

TECHNICAL BACKGROUND

Data communication systems exchange user data for user equipment (UEs) to provide various data communication services. The UEs may be phones, computers, media players, intelligent machines, and the like. The data communication services might be media streaming, video conferencing, machine-to-machine data transfers, Internet access, or some other computerized information service. Data communication systems use wireless access points to extend the range of their communication services and enable user mobility. The wireless access points perform wireless networking tasks like device handovers, radio interference management, and multipoint coordination.

To extend the wireless footprint even more, wireless repeaters are used in between the wireless access points and the UEs. A wireless repeater receives a wireless signal from a UE and then amplifies, filters, and retransmits the signal for receipt by the wireless access point or another wireless repeater. Likewise, a wireless repeater receives a wireless signal from the wireless access point. The wireless repeater amplifies, filters, and retransmits the signal for receipt by the UE or another wireless repeater. Chains or sequences of wireless repeaters are often used to cover roadways and trails with wireless data communication service. Although repeaters are a useful solution to expanding network coverage, each repeater may increase the noise or interference within its coverage area. When there is a lot of noise or interference at the wireless access point, a UE may need to increase its transmission power, which negatively impacts battery life.

OVERVIEW

Examples disclosed herein provide a system, method, hardware, and software to configure resource block usage in wireless repeaters. The method includes a wireless access point transferring user data for User Equipment (UEs) wherein some of the UEs are connected to the wireless repeaters. The method also includes the wireless access point determining an average uplink transmission power for the UEs, and if the average uplink transmission power for the UEs exceeds an uplink transmission power threshold, then the wireless access point determines resource block restrictions for the wireless repeaters. The method further includes the wireless access point transferring the resource block restrictions for delivery to the wireless repeaters.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
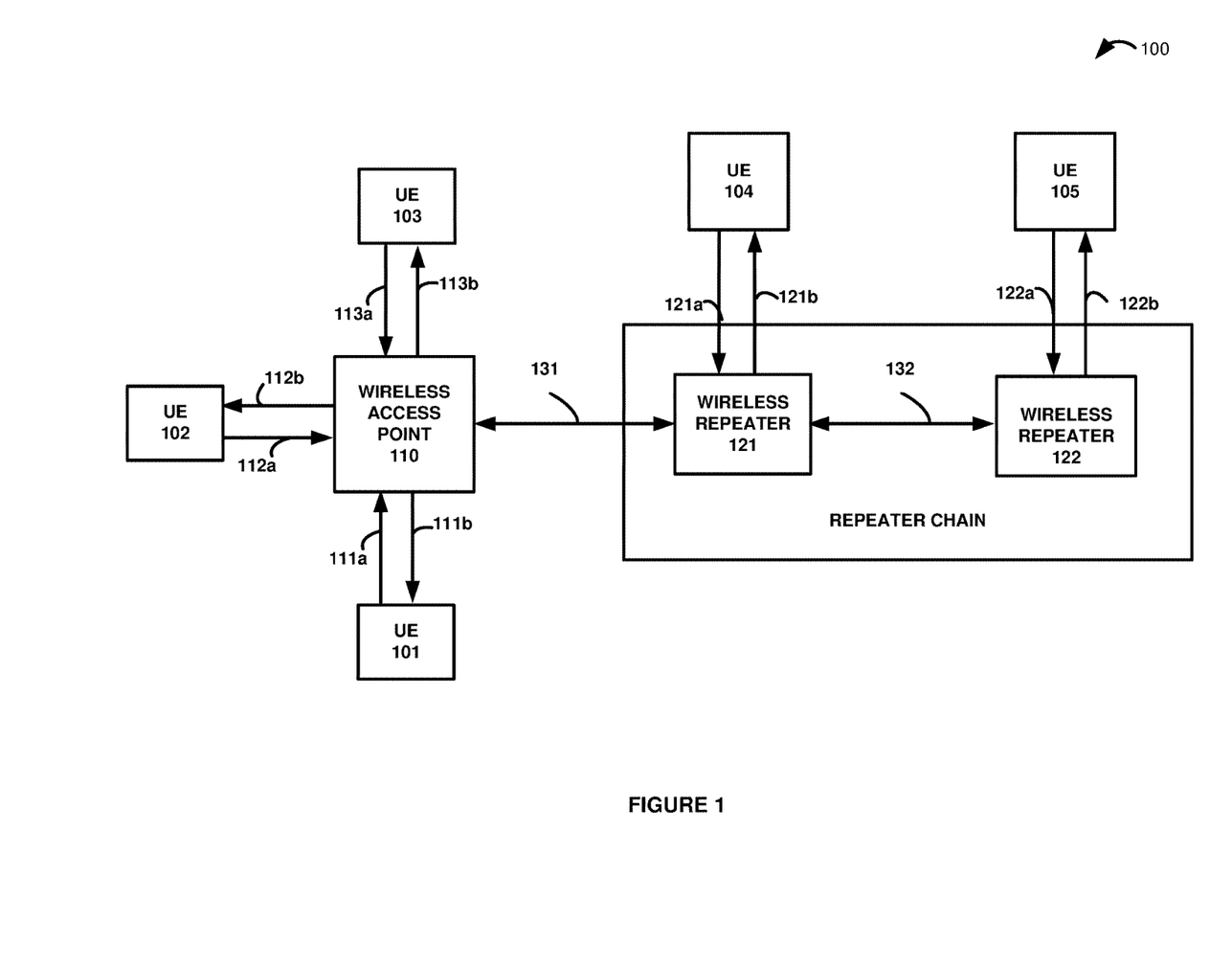
FIG. 1 illustrates a wireless communication system to configure resource block usage a wireless repeater.

FIG. 1 illustrates wireless communication system 100 to configure resource block usage for wireless repeaters 121-122. Wireless communication system 100 includes User Equipment (UEs) 101-105, wireless access point 110, wireless repeaters 121-122, and communication links 111-113, 121-122, and 131-132. Wireless repeaters 121-122 form a repeater chain. In some examples, there may be more or fewer wireless repeaters.

UEs 101-103 communicate with wireless access point 110 over wireless communication links 111-113, respectively. Wireless links 111a-113a represent an uplink channel from UEs 101-103 to wireless access point 110. Wireless links 111b-113b represent a downlink channel from wireless access point 110 to UEs 101-103, respectively. Wireless access point 110 and wireless repeater 121 communicate over communication link 131, which may include both uplink and downlink components. Wireless repeater 121 and 122 communicate over communication link 132, which may include both uplink and downlink components. Wireless repeater 121 and UE 104 communicate over wireless communication link 121a (uplink) and 121b (downlink). Wireless repeater 122 and UE 105 communicate over wireless communication link 122a (uplink) and 122b (downlink).

Communication links 111-113, 121-122, and 131-133 may use any of a variety of communication media, such as air, metal, optical fiber, or any other signal propagation path, including combinations thereof. Also, the links may use any of a variety of communication protocols, such as Internet, telephony, optical networking, wireless communication, wireless fidelity, code division multiple access, worldwide interoperability for microwave access, or any other communication protocols and formats, including combinations thereof. Further, communication links 111-113, 121-122, and 131-132 could be direct links or they might include various intermediate components, systems, and networks.

UEs 101-105 could each be a phone, tablet computer, media device, an intelligent machine, or some other apparatus having a wireless transceiver. UEs 101-105 include processing circuitry and memory that store and execute various software modules. UEs 101-105 may wirelessly receive and transmit Radio Frequency (RF) signals to wireless access point 110 and wireless repeaters 121-122.

Wireless access point 110 may comprise a macro base station, a wireless hotspot, an evolved NodeB (eNodeB), or some other base station that may provide wireless communication services to UEs 101-105 in conjunction with wireless repeaters 121-122. Wireless access point 110 includes RF communication circuitry, communication interfaces, network interfaces, processing systems, microprocessors, storage systems, storage media, or some other processing devices or software systems, and may be distributed among multiple devices.

Wireless repeaters 121-122 in this repeater chain typically include amplifiers, filters, RF modulators, and signal processing circuitry. Wireless repeaters 121-122 may be configured to extend wireless coverage to one or more UEs for voice calls, media streaming, Internet access, text messages, and the like. Wireless repeaters 121-122 are capable of receiving and transmitting an RF signal that comprises multiple component frequencies.

In operation, wireless access point 110 transfers user data for UEs 101-105. In this example, UEs 104-105 are connected to wireless repeaters 121-122, respectively. User data may comprises streaming media, voice or video call data, web browsing data, or some other type of user data. Wireless access point 110 determines an average uplink transmission power for UEs 101-103. For example, wireless access point 110 may monitor the uplink transmission power for UEs 101-103. In other examples, wireless access point may monitor all UEs 101-105. In yet other examples, wireless access point 110 monitors all UEs 101-105 and wireless repeaters 121-122. Wireless access point 110 may monitor the uplink transmission for a period of time and calculate the average uplink transmission power for that period of time.

If the average uplink transmission power for UEs 101-103 exceeds an uplink transmission power threshold, then wireless access point 110 determines resource block restrictions for wireless repeaters 121-122. In some examples, the resource block restrictions comprise disabling a Long Term Evolution (LTE) channel, an LTE band, or an LTE resource block area. Wireless access point 110 transfers the resource block restrictions for delivery to wireless repeaters 121-122. In some examples, wireless access point 110 determines resource block restrictions for the wireless repeater further away (i.e. more hops), in this example wireless repeater 122, before determining resource block restrictions for the closer wireless repeater (i.e. wireless repeater 121). Advantageously, restricting resource block usage in the wireless repeaters may decrease the overall uplink transmission power required of the UEs, which increases battery life and improves user experience.

Although not required, wireless access point 110 may continue to monitor the uplink transmission power from UEs 101-103, and if the average uplink transmission power continues to be above the uplink power transmission threshold, wireless access point 110 may determine additional resource block restrictions and transfer the additional resource block restrictions for delivery to wireless repeaters 121-122. For example, wireless access point 110 may disable more resource blocks in wireless repeaters 121-122. In some examples, wireless access point 110 may monitor the average uplink transmission power, and if the average uplink transmission power drops below the uplink power transmission threshold, wireless access point 110 may enable resource blocks in wireless repeaters 121-122.

Figure 2:
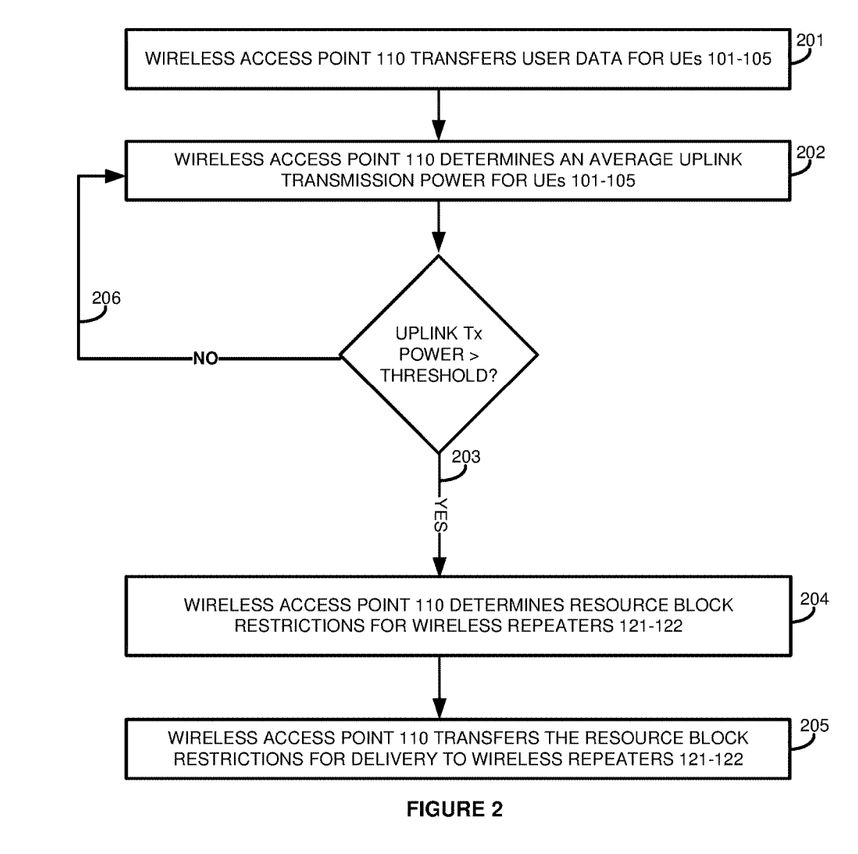
FIG. 2 illustrates the operation of the wireless communication system to configure resource block usage in the wireless repeater.

FIG. 2 illustrates the operation of wireless communication system 100 to restrict resource block usage in wireless repeaters 121-122. Wireless access point 110 transfers user data for UEs 101-105 (201). For example, wireless access point transmits user data over the downlink channel between UEs 101-103 and wireless access point 110. Additionally, wireless access point 110 may transmit user data over a downlink channel between wireless access point 110 and wireless repeaters 121-122. Wireless repeaters 121-122 in turn transmit the user data to UEs 104-105, respectively. Wireless access point 110 determines an average uplink transmission power for UE 101-105 (202). In some examples, wireless access point 110 may monitor the uplink transmission power for UEs 101-105 over a period of time and calculate an average.

If the average uplink transmission power for UE 101-105 exceeds an uplink transmission power threshold (203), then wireless access point 110 determines resource block restrictions for wireless repeaters 121-122 (204) and transfers the resource block restrictions for delivery to wireless repeaters 121-122 (205). If the average uplink transmission power for UE 101-105 does not exceed the uplink transmission power threshold (206), wireless access point 110 continues to determine the average uplink transmission power for UEs 101-105 (202). In some examples, wireless repeaters 121-122 may restrict resource block usage by adjusting the frequency.

Figure 3:
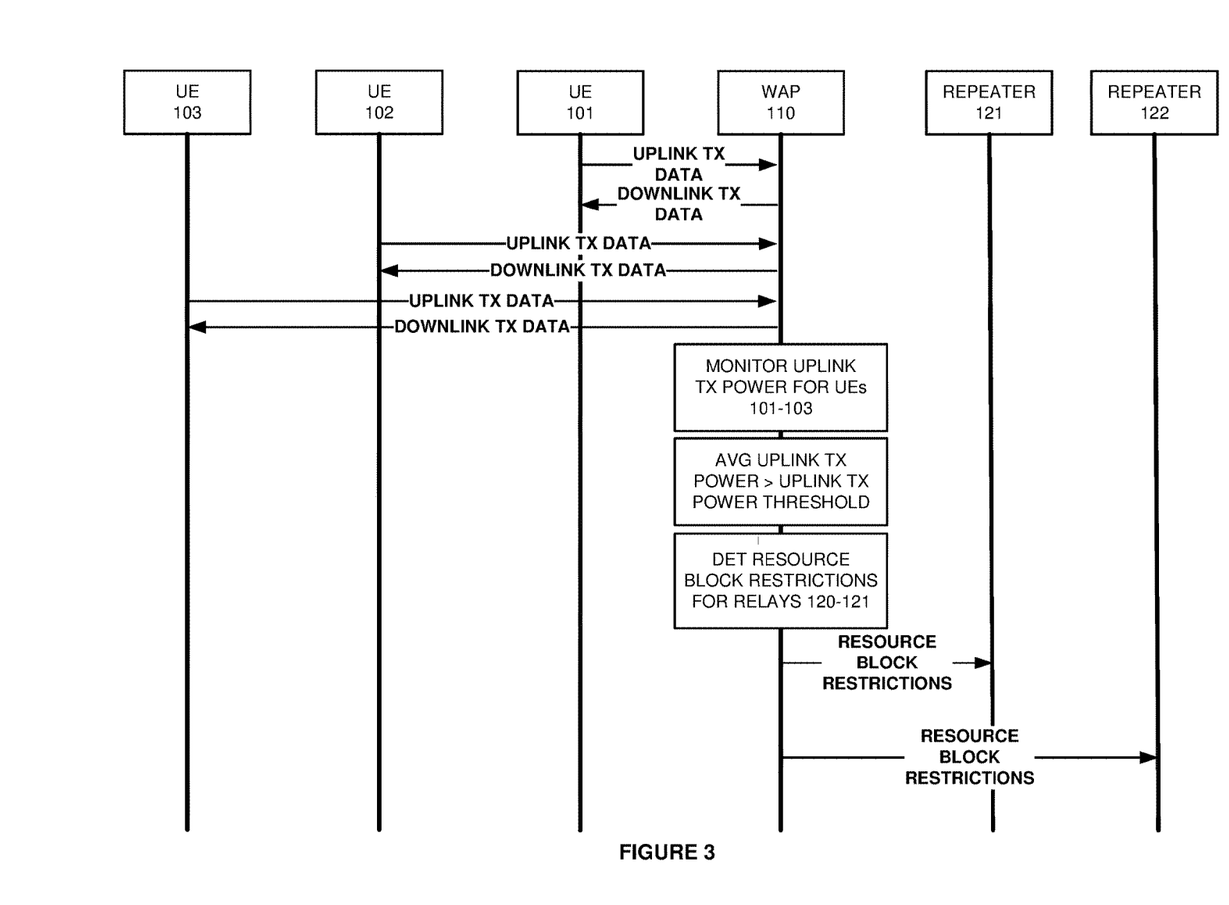
FIG. 3 illustrates the operation of the wireless communication system to configure resource block usage in the wireless repeater.

FIG. 3 illustrates the operation of wireless communication system 100 to restrict resource block usage for wireless repeaters 121-122. UEs 101-103 have active communication sessions with wireless access point (WAP) 110 and exchange user data with wireless access point 110. Wireless access point 110 transfers user data to UEs 101-103 via a downlink channel. UEs 101-103 transfer user data to wireless access point 110 via an uplink channel. Wireless access point 110 monitors an uplink transmission power for UEs 101-103 over the uplink transmission channel.

Wireless access point determines an average uplink transmission power for UEs 101-103 and compares the average uplink transmission power to an uplink transmission power threshold. The average uplink transmission power exceeds the uplink power transmission threshold, so wireless access point 110 determines resource block restrictions for wireless relays 121-122. Wireless access point 110 transfers the resource block restrictions for delivery to wireless relays 121-122. In some examples, a digital signaling processing system (DSP) may attenuate certain resource blocks to an energy level of zero based on the resource block restrictions. Although not required, the DSP may receive the resource block restrictions in a configuration file that is coded in Simple Network Management Protocol (SNMP).

Figure 4:
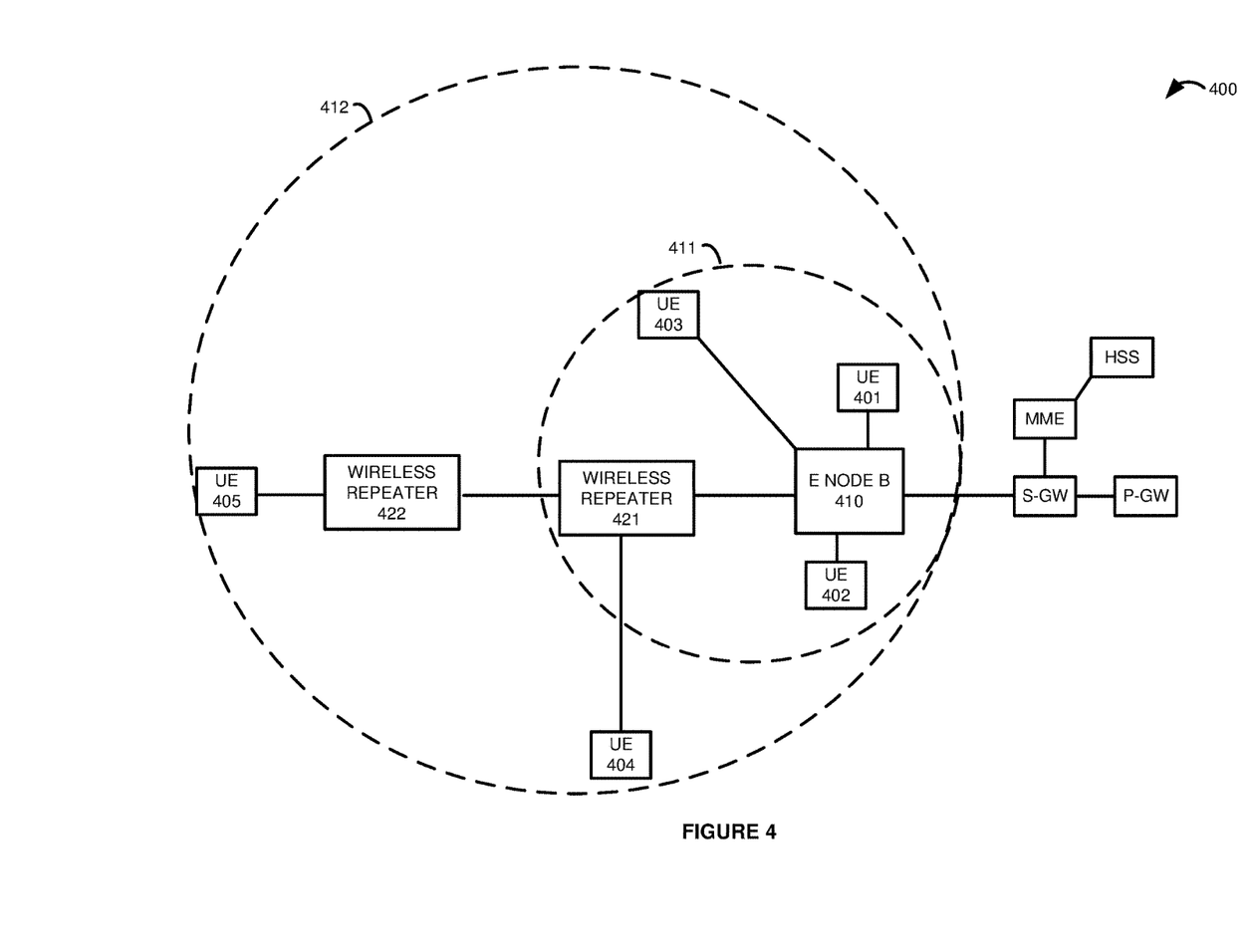
FIG. 4 illustrates a Long Term Evolution (LTE) communication system to configure resource block usage in a wireless repeater.

FIG. 4 illustrates Long Term Evolution (LTE) communication system 400 to configure resource block restrictions for wireless repeaters 421-422. LTE communication system 400 includes User Equipment (UEs) 401-405, eNodeB 410, wireless repeaters 421-422, Serving Gateway (S-GW), Packet Data Network (PDN) Gateway (P-Gateway), Mobility Management Entity (MME), Home Subscriber Server (HSS), and wireless coverage sectors 411-412. Wireless coverage sector 411 is the coverage area of eNodeB 410. Wireless coverage sector 412 is the extended coverage area of eNodeB 410 with wireless repeaters 421-422. Wireless repeater 421-422 form a repeater chain to eNodeB 410.

UEs 401-405 exchange user data with eNodeB 410. UEs 404 and 405 are connected to eNodeB 410 via wireless repeaters 421 and 422, respectively. Wireless repeaters 421-422 receive user data from eNodeB 410 and rebroadcast the user data to UEs 404-405. UEs 401-405 transmit user data via an uplink channel to eNodeB 410. ENodeB 410 transmits user data via a downlink channel to UEs 401-403, and to wireless repeaters 421-422. ENodeB 410 monitors an uplink transmission power over the uplink transmission channel for UEs 401-403. In some examples, eNodeB 410 may also monitor the uplink channel between eNodeB 410 and wireless repeaters 421-422.

ENodeB 410 determines an average uplink transmission power for UEs 401-403, and in some cases includes the uplink transmission power of wireless repeaters 421-422. If the average uplink transmission power for UEs 401-403 exceeds an uplink transmission power threshold, then eNodeB 410 determines resource block restrictions for wireless repeaters 421-422. In some examples, eNodeB 410 may determine a pattern (i.e. checker pattern) for disabling resource blocks in wireless repeaters 421-422. In other words, resource blocks in wireless repeaters 421-422 may be disabled/enabled in a checker board pattern. ENodeB 410 transfers the resource block restrictions for delivery to wireless repeaters 421-422. In some examples, resource blocks may be restricted in one or both of wireless repeaters 421-422.

Although not required, eNodeB may determine the location of each of UEs 401-405 and/or wireless repeaters 421-422, determine an average uplink transmission for each location, and determine resource block restrictions based on the location where the uplink transmission power exceeds the uplink transmission power threshold. For example, eNodeB 410 may disable resource blocks in wireless repeater 422, which is further away (or more hops) from eNodeB 410, before disabling resource blocks in wireless repeater 421, which is closer (or fewer hops) from eNodeB 410.

Figure 5:
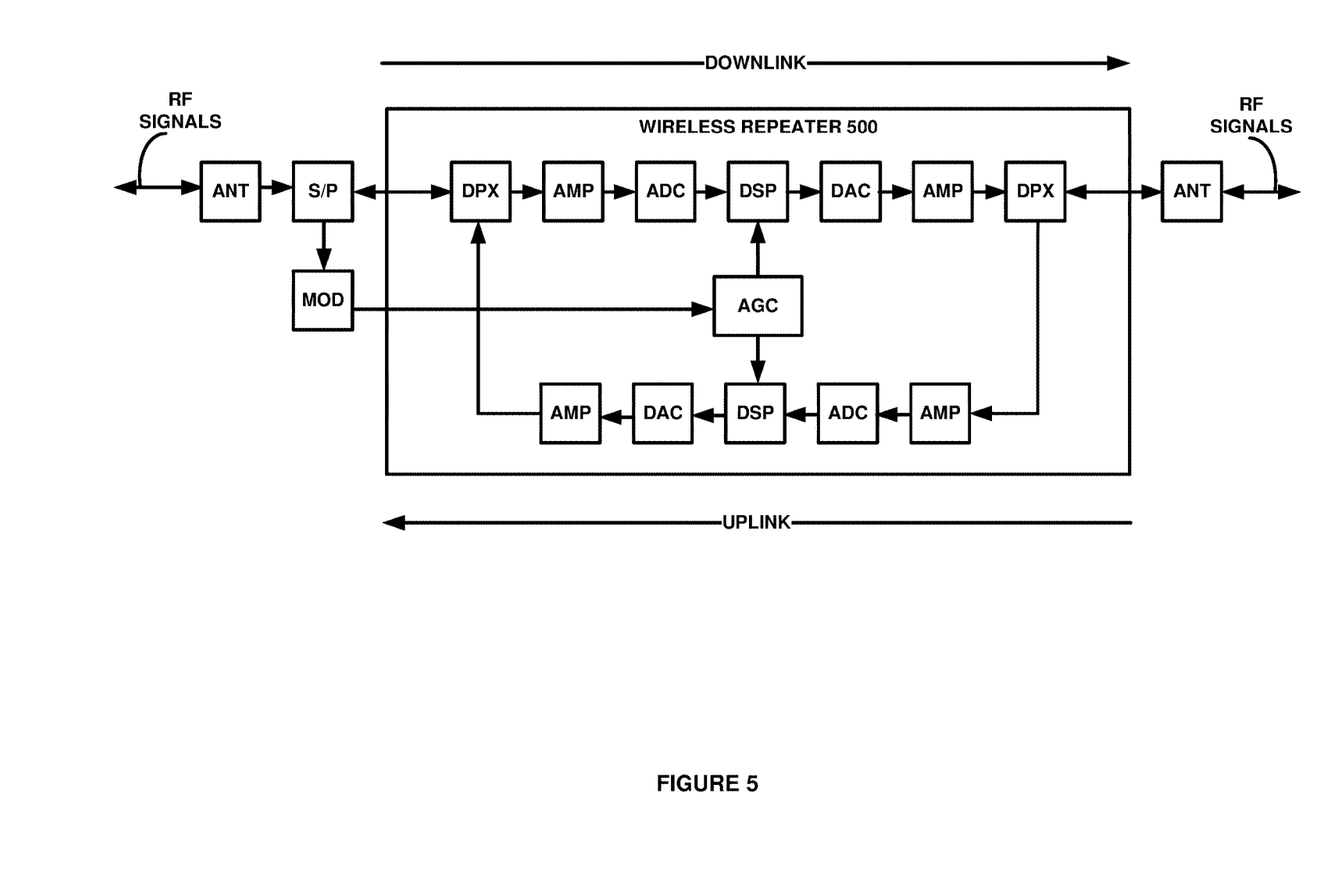
FIG. 5 illustrates an example of a wireless repeater to configure resource block usage.

In another example, eNodeB 410 determines the location of each UE 401-405/wireless repeater 421-422, determines an average uplink transmission power for each UE 401-405/wireless repeater 421-422, and determines resource block restrictions based on the location of the UEs/wireless repeaters with an average uplink transmission power that exceeds the uplink transmission power threshold. For example, if the average uplink transmission power for UE 403 (located at the edge of cell coverage area 411) is above the uplink transmission power threshold, then eNodeB 410 may disable resource blocks in wireless repeater 422. In some examples, FIG. 5 illustrates wireless repeater 500 to restrict resource block usage. Wireless repeater 500 is an example of wireless repeaters 121-122 and wireless repeaters 421-422, although wireless repeaters 121-122 and wireless repeaters 421-422 may use alternative configurations and operations. Wireless repeater 500 includes RF signals with multiple frequency components, antenna systems, Automatic Gain Control (AGC) systems, a splitter (S/P), and a modem (MOD). Wireless repeater 500 also includes duplexers (DPX), amplifiers (AMP), analog-to-digital converters (ADC), digital signaling processing systems (DSP), and digital-to-analog converters (DAC).

In operation, RF signals that comprise multiple frequency components are input into wireless repeater 500. RF signals may be uplink signals, downlink signals, or synthetic signals inserted by wireless repeater 500, received from another wireless repeater, or received from a wireless access point. The RF signals are then delivered to the splitter, which splits the RF signals and transfers the split RF signals to a modem and a duplexer. The duplexer transfers the RF signals to the amplifier.

At this point in the process, RF signals are transferred to an analog-to-digital converter by the amplifier and the converter transfers the converted RF signals to a DSP. The DPS processes frequency responses and determines frequency gains. The DPS can also apply received frequency gains. After processing, the RF signals are transferred to a digital-to-analog convertor, which converts the RF signals and transfers the converted RF signals to an amplifier.

The amplifier then transfers the RF signals to a duplexer that transfers the RF signals to another antenna system. Downlink RF signals go from left to right and uplink RF signals go from right to left. The modem transfers the RF signals to the AGC system, which processes the RF signals and determines whether to apply AGC.

Figure 6:
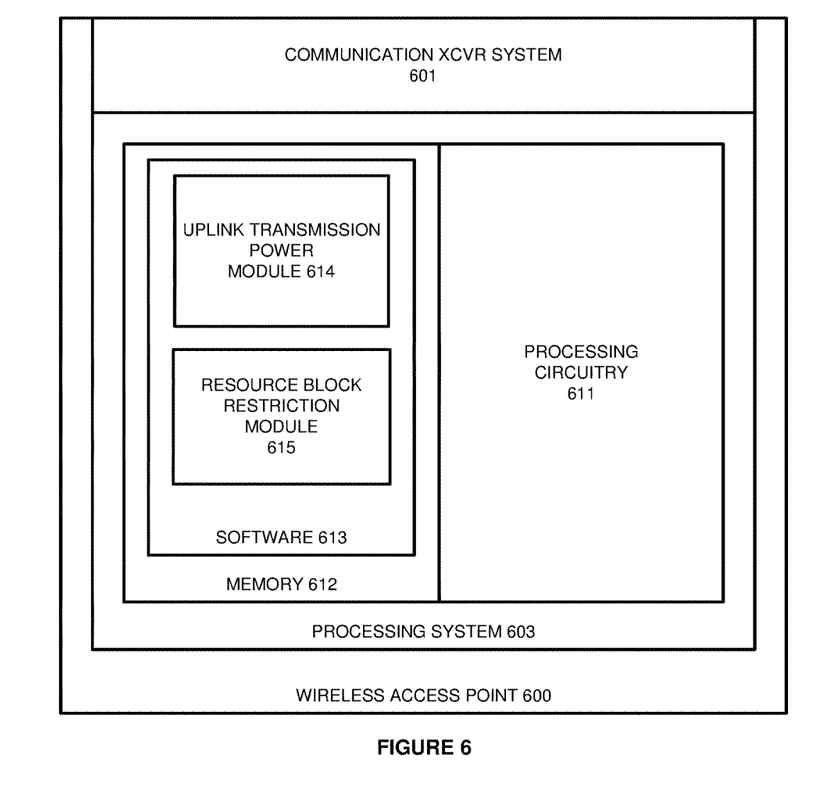
FIG. 6 illustrates an example of a wireless access point to configure resource block usage.

FIG. 6 illustrates wireless access point 600 to configure resource block restrictions for a wireless repeater. Wireless access point 600 is an example of wireless access point 110 and eNodeB 410. Although these systems may use alternative configurations and operations. Wireless access point 600 comprises communication transceiver system 601 and processing system 603. Processing system 603 includes processing circuitry 611 and memory 612 that stores software 613. Software 613 comprises software modules 614-615.

Communication transceiver systems 601 comprise components that communicate over communication links such as network cards, ports, RF transceivers, processing circuitry and software, or some other communication components. Communication transceiver systems 601 may be configured to communicate over metallic, wireless, or optical links. Communication transceiver systems 601 may be configured to use TDM, IP, Ethernet, optical networking, wireless protocols, communication signaling, or some other communication format—including combinations thereof. Communication transceiver system 601 may receive and transfer user communication data over the uplink and downlink communication channels, respectively. Communication transceiver system 601 may also transfer resource block restrictions a wireless repeater.

Processing circuitry 611 comprises microprocessor and other circuitry that retrieves and executes operating software 613 from memory 612. Processing circuitry 611 may comprise a single device or could be distributed across multiple devices—including devices in different geographic areas. Processing circuitry 611 may be embedded in various types of equipment. Examples of processing circuitry 611 include central processing units, application specific processors, logic devices, and/or any type of computer processing devices—including combinations thereof.

Memory 612 comprises a non-transitory computer readable storage medium readable by processing system 603 and capable of storing software 613, such as a disk drive, flash drive, data storage circuitry, or some other hardware memory apparatus—including combinations thereof. Memory 612 can include volatile and/or non-volatile, removable and non-removable media implemented in any method or technology for storage of information, such as computer readable instructions, data structures, program modules, or other data—including combinations thereof. Memory 612 may comprise a single device or could be distributed across multiple devices—including devices in different geographic areas. Memory 612 may be embedded in various types of equipment. In some examples, a computer apparatus could comprise memory 612 and software 613.

Software 613 comprises computer programs, firmware, or some other form of machine-readable processing instructions. Software 613 may include an operating system, utilities, drivers, network interfaces, applications, or some other type of software. In this example, software 613 comprises uplink transmission power module 614 and resource block restriction module 615. Although software 613 could have alternative configurations in other examples. Software 613 may be implemented in program instructions and may be executed by processing system 603. Software 613 may include additional processes, programs, or components, such as operating system software, database software, or application software—including combinations thereof. Software 613 may also comprise firmware or some other form of machine-readable processing instructions executable by processing system 603.

When executed, software 613 directs processing system 603 to operate as described herein to configure resource block restrictions in a wireless repeater. In particular, uplink transmission power module 614 directs processing system 603 to monitor the uplink transmission power from connected UEs and determine an average uplink transmission power and compare the average uplink transmission power to an uplink transmission power threshold. Resource block restriction module 615 directs processing system 603 to determine resource block restrictions for a wireless repeater.

Referring back to FIG. 1, UEs 101-105 comprise Radio Frequency (RF) communication circuitry and an antenna. The RF communication circuitry typically includes an amplifier, filter, modulator, and signal processing circuitry. UEs 101-105 may also include a user interface, memory device, software, processing circuitry, or some other communication components. UEs 101-105 may be a telephone, computer, e-book, mobile Internet appliance, wireless network interface card, media player, game console, or some other wireless communication apparatus—including combinations thereof.

Wireless access point 110 comprises RF communication circuitry and an antenna. The RF communication circuitry typically includes an amplifier, filter, RF modulator, and signal processing circuitry. Wireless access point 110 may also comprise a router, server, memory device, software, processing circuitry, cabling, power supply, network communication interface, structural support, or some other communication apparatus. Wireless access point 110 could be a base station, eNodeB, wireless repeater, Internet access node, telephony service node, wireless data access point, or some other wireless communication system—including combinations thereof.

Wireless links 111-113, 121-122, and 131-132 use the air or space as the transport media. Wireless links 111-113, 121-122, and 131-132 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WWI), High Speed Packet Access (HSPA), or some other wireless communication format. Communication links 111-113, 121-122, and 131-132 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system to restrict resource block usage in wireless repeaters, the method comprising:
    a wireless access point transferring user data for multiple User Equipment (UEs) wherein some of the UEs are connected to the wireless repeaters;
    the wireless access point determining an average uplink transmission power for the UEs;
        if the average uplink transmission power for the UEs exceeds an uplink transmission power threshold, then the wireless access point determining resource block restrictions for the wireless repeaters and transferring the resource block restrictions for delivery to the wireless repeaters, wherein the wireless access point determines and transfers the resource block restrictions for the wireless repeaters furthest away from the wireless access point before determining and transferring the resource block restrictions for the wireless repeaters closest to the wireless access point.

2. The method of claim 1 wherein at least some of the resource block restrictions comprise disabling a Long Term Evolution (LTE) channel of an LTE band in an LTE network.

3. The method of claim 1 wherein at least some of the resource block restrictions comprise disabling a Long Term Evolution (LTE) band.

4. The method of claim 1 wherein at least some of the resource block restrictions comprise disabling a Long Term Evolution (LTE) resource block area.

5. The method of claim 1 wherein at least some of the resource block restrictions comprise disabling a Long Term Evolution (LTE) resource block pattern.

6. The method of claim 1 wherein the wireless access point determining the resource block restrictions further comprises the wireless access point determining and transferring the resource block restrictions for the wireless repeaters having a highest repeater hop count to the wireless access point before determining and transferring the resource block restrictions for the wireless repeaters having a lowest repeater hop count to the wireless access point.

7. The method of claim 1 wherein, if the average uplink transmission power for the UEs falls below another uplink transmission power threshold, then the wireless access point determining resource block increases for the wireless repeaters and transferring the resource block increases for delivery to the wireless repeaters.

8. The method of claim 7 wherein at least some of the resource block increases comprise enabling a Long Term Evolution (LTE) channel of an LTE band in an LTE network.

9. The method of claim 1 wherein at least some of the resource block increases comprise enabling a Long Term Evolution (LTE) resource block pattern.

10. A wireless communication system to restrict resource block usage in wireless repeaters, the wireless communication system comprising:
    a wireless access point configured to transfer user data for multiple User Equipment (UEs) wherein some of the UEs are connected to the wireless repeaters;
    the wireless access point configured to determine an average uplink transmission power for the UEs;

if the average uplink transmission power for the UEs exceeds an uplink transmission power threshold, then the wireless access point configured to determine and transfer resource block restrictions for the wireless repeaters furthest away from the wireless access point before determining and transferring the resource block restrictions for the wireless repeaters closest to the wireless access point.

11. The wireless communication system of claim 10 wherein at least some of the resource block restrictions comprise disabling a Long Term Evolution (LTE) channel of an LTE band in an LTE network.

12. The wireless communication system of claim 10 wherein at least some of the resource block restrictions comprise disabling a Long Term Evolution (LTE) band.

13. The wireless communication system of claim 10 wherein at least some of the resource block restrictions comprise disabling a Long Term Evolution (LTE) resource block area.

14. The wireless communication system of claim 10 wherein at least some of the resource block restrictions comprise disabling a Long Term Evolution (LTE) resource block pattern.

15. The wireless communication system of claim 10 wherein the wireless access point is further configured to determine and transfer the resource block restrictions for the wireless repeaters having a highest repeater hop count to the wireless access point before determining and transferring the resource block restrictions for the wireless repeaters having a lowest repeater hop count to the wireless access point.

16. The wireless communication system of claim 10 wherein, if the average uplink transmission power for the UEs falls below another uplink transmission power threshold, then the wireless access point further configured to determine resource block increases for the wireless repeaters and transfer the resource block increases for delivery to the wireless repeaters.

17. The wireless communication system of claim 16 wherein at least some of the resource block increases comprise enabling a Long Term Evolution (LTE) channel of an LTE band in an LTE network.

18. The wireless communication system of claim 10 wherein at least some of the resource block increases comprise enabling a Long Term Evolution (LTE) resource block pattern.

* * * * *